United States Patent
Harper et al.

(10) Patent No.: US 6,700,871 B1
(45) Date of Patent: Mar. 2, 2004

(54) INCREASED THROUGHPUT ACROSS DATA NETWORK INTERFACE BY DROPPING REDUNDANT PACKETS

(75) Inventors: Matthew Harper, Arlington Heights, IL (US); Timothy G. Mortsolf, Lisle, IL (US); Kenneth L. Peirce, Jr., Barrington, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/305,133

(22) Filed: May 4, 1999

(51) Int. Cl.[7] ............................ H04L 12/26; H04L 1/18; G06F 15/173
(52) U.S. Cl. ...................... 370/235; 370/230; 370/477; 709/225; 709/229; 714/748
(58) Field of Search ............................... 370/229–238, 370/428–429, 400–408, 477; 709/203, 219, 224, 223, 229, 225; 714/746–750

(56) References Cited

U.S. PATENT DOCUMENTS

| | | | | |
|---|---|---|---|---|
| 4,775,974 A | * | 10/1988 | Kobayashi | 370/231 |
| 5,528,595 A | | 6/1996 | Walsh et al. | |
| 5,878,226 A | * | 3/1999 | Benner et al. | 709/233 |
| 6,038,216 A | * | 3/2000 | Packer | 370/235 |
| 6,118,765 A | * | 9/2000 | Phillips | 370/235 |
| 6,181,704 B1 | * | 1/2001 | Drottar et al. | 370/231 |
| 6,473,425 B1 | * | 10/2002 | Bellaton et al. | 370/401 |

FOREIGN PATENT DOCUMENTS

EP          912028 A2 *  4/1999   ........... H04L/29/06

OTHER PUBLICATIONS

Internetworking With TCP/IP, vol. 1: Principals, Protocols, and Architecture, Third Edition, Douglas E. Comer, published by Prentice–Hall, Inc., 1995, pp. 191–228.

* cited by examiner

*Primary Examiner*—Steven H. D Nguyen
(74) *Attorney, Agent, or Firm*—McDonnell Boehnen Hulbert & Berghoff

(57) ABSTRACT

In a typical remote access application, such as access from the home to a packet-switched high speed network such as the Internet, the low-speed dial up connection to a network access is the main bottleneck in terms of the bandwidth and efficiency of transfer of data across the network access server. The present invention increases throughput through the network access server by identifying and dropping redundant, e.g., retransmitted, packets en route from the LAN or WAN to the remote terminal, thereby preserving precious bandwidth.

50 Claims, 7 Drawing Sheets

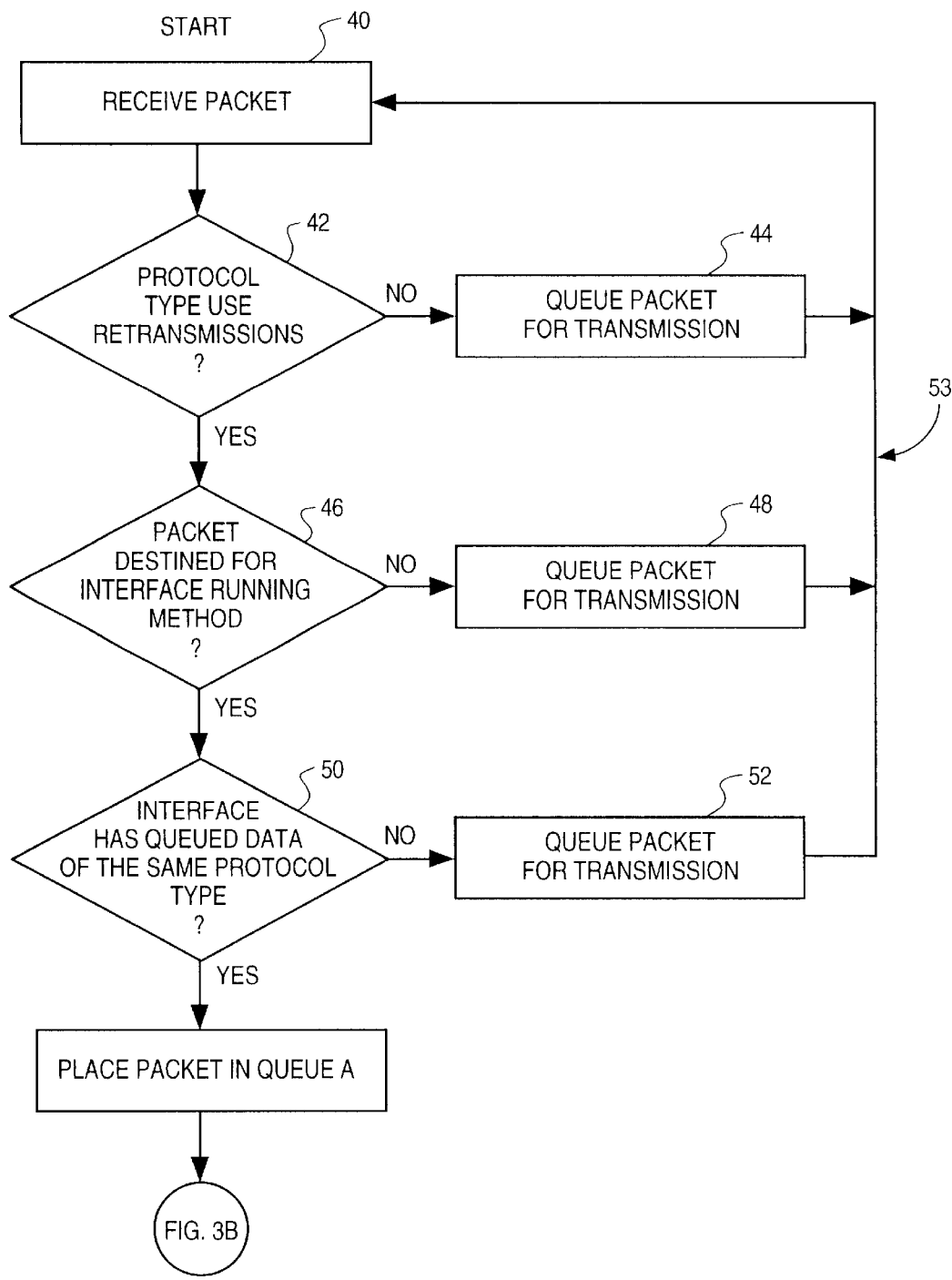

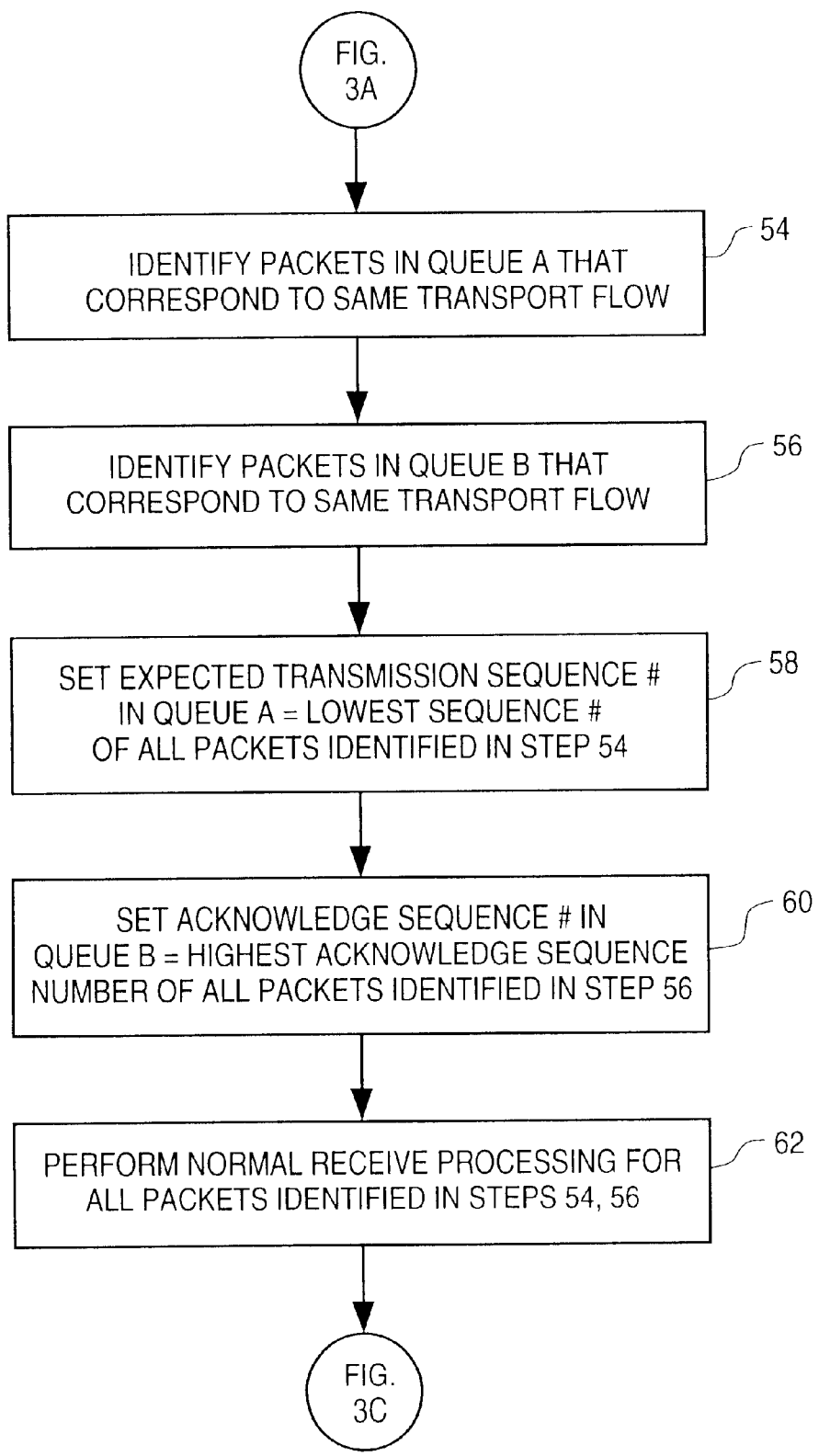

INCREASED THROUGHPUT ACROSS DATA NETWORK INTERFACE BY DROPPING REDUNDANT PACKETS

BACKGROUND OF THE INVENTION

A. Field of the Invention

This invention is related to the field of telecommunications and the process by which digital data is transmitted between computer systems over a telephone network or other communications link and a high speed computer network. The invention is particularly suitable for use in devices that support the forwarding of packetized data between two communications media where there is a significant speed differential between the two media. An example of such a device is a network access server (sometimes referred to in the art as a remote access server), where Internet Protocol (IP) or Internet Exchange Protocol (IPX) packets are exchanged between a high-speed local or wide area packet-switched data network and a low-speed dial-up Point-to-Point Protocol link, such as the public switched telephone network. The remote access server connects a remotely located personal computer or other terminal dialing in over a slow PSTN link to a computer or other source of data resident on the high-speed data network.

The present invention achieves an increase in throughput across the interface by dropping redundant packets, that is, dropping the packets entirely or, alternatively, dropping the (redundant) data present in packets going across the interface and transmitting the header for the redundant packet. By dropping redundant packets in the network access server that are en route to the remote terminal, in accordance with a principal aspect of the present invention, the speed and efficiency by which the remote terminal can download files or data from the high-speed network is improved since precious bandwidth on the low-speed link is not being wasted by transmission of packets that have already been received by the remote terminal. The invention can be used in many different application, such as Internet or corporate network access for users dialing in to a network computer over low speed links, e.g., voice grade telephone circuits.

B. Description of Related Art

In order for communication between two computers over a communications medium to be possible, the computers and the equipment in the medium connecting the computers together must follow certain rules or procedures, known in the art as protocols. The communications industry has standards bodies that adopt protocols to govern many different aspects of data communication. These protocols can be modeled as a hierarchy of levels, sometimes referred to as the Open Systems Interface (OSI) model. The lowest level concerns the physical medium connecting the computers together. Above this layer in the model are protocols related to media access control, data link, network, transport, session, presentation, and application features, in ascending order.

Transport layer networking protocols use a variety of techniques to achieve reliable delivery of data. All rely on some form of acknowledgement and retransmission paradigm of some sort. The most common method is to utilize a sliding window protocol with some form of end-to-end acknowledgement required to advance the transmitter's window. Intermediate nodes between the two computers (such as routers) do not participate in the algorithm as they typically provide only network layer services (packet forwarding).

For example, a transport protocol known as Transmission Control Protocol uses a scheme where the receiving endpoint transmits a cumulative acknowledgment of all contiguous data properly received, as well as the currently allowed receive window size (which varies over time), to the transmitting endpoint. The transmitting endpoint uses this feedback information to select what data to (re)transmit. This scheme provides flow control as well as reliable transfer. TCP uses an adaptive retransmission algorithm that is driven based on estimated round-trip times for acknowledgments.

For unicast transport-level flows, packets are generated on the source node, passed through various intermediate nodes, e.g., routers, and finally arrive at the destination. In packet switched networks (such as the Internet), packets can arrive at the destination in order, out of order, more than once, or not at all. The same is true for intermediate nodes. There are two major differences between the intermediate and the destination nodes of a flow. Intermediate nodes are not typically notified of flow establishment/termination, and intermediate nodes do not generally generate feedback information to the source node of the flow. The function provided by most intermediate nodes is to simply forward packets.

In the present state of the art, advanced intermediate nodes are capable of grooming/shaping traffic based on dynamic network load and quality of service (QOS) criteria. This grooming/shaping function consists of reordering packets and selecting packets to drop. Basically, the grooming/ shaping function is a scheme to arbitrate the use of congestion points in the network and to provide certain users increased throughput, lower latency, or higher reliability. These types of functions are usually deployed in networks that are over-provisioned. Networks maintained by Internet Service Providers (ISPs) are a common example of an over-provisioned network. They sell more network capacity than they have based on statistical usage patterns to generate revenues.

To perform this grooming/shaping function, intermediate nodes must perform some packet queuing. This queuing allows the nodes to deal with "bursty" traffic without loss of packets. The amount of queuing introduced in a router directly effects maximum forwarding latency (transit delay) and its ability to deal with periods of time where use of an interface on the router is oversubscribed. In general, routers attempt to minimize queuing, as reducing the amount of forwarding latency to a minimum is an overriding concern.

Most users connect to the Internet at the network layer via low-speed modems (<128 Kbps) using the Internet Protocol version 4 (iPv4), encapsulated by the Point To Point Protocol (PPP). The user's phone calls are routed from the public switched telephone network onto the ISP networks via a device known as a Network Access Server (NAS). A representative network access server is described in the patent to Dale M. Walsh, et al., U.S. Pat. No. 5,528,595, which is incorporated by reference herein. The NAS is connected via a high-speed LAN or WAN interface to the Internet and to the user via a relatively low speed PPP modem connection over the public switched telephone network, cellular telephone network or other communications medium. Network access servers similar in architecture and functionality of the above-referenced Walsh et al. patent are currently commercially available from. 3Com Corporation, the assignee of the present invention, and from other vendors in the industry.

It is a widely recognized truism that a user's desired bandwidth for network access (e.g., Internet or corporate network access) is almost always greater than the available bandwidth provided by the modem link. It is also a truism that for most remote access applications, including Internet access, the flow of information and data from the computer on the network to the remote terminal or user is typically much-greater than the flow of data going in the opposite direction. While asymmetrical communications techniques, such as the V.90 56 K technology, help somewhat, this phenomenon usually results in a significant queuing of data directed from the high-speed LAN/WAN interface towards the low-speed modem interface. Moreover, the PPP/modem connection linking the remote user or terminal to the network access server is the bottleneck limiting bandwidth in most remote access scenarios, since the maximum speed of dial-up network access servers is 56 Kbps over a conventional phone line (asymmetrical digital subscriber line (ADSL) and other less common techniques excluded), whereas the transmission rates on the data network is order of magnitudes faster.

Numerous approaches have been proposed in the art to address this bandwidth bottleneck issue. These approaches included faster modem modulation schemes, such as the 56 Kbps technique adopted in the ITU-T V.90 standard, modem data compression in accordance with the V.42 bis Standard, PPP header compression, ADSL and other asymmetric techniques, Van Jacobson's TCP/IP header compression for PPP, and PPP data compression schemes promoted by Microsoft Corporation and STAC Electronics. Obviously, this is a critical problem.

Much of the network traffic directed towards the remote user is Transmission Control Protocol (TCP) traffic. Fortunately, TCP contains congestion avoidance algorithms to prevent large numbers of dropped packets (due to finite data queuing in the NAS) and retransmissions, thus preventing "congestion collapse" of the user's PPP modem link. TCP also maintains a transmit congestion avoidance window and round-trip acknowledgement (ACK) timers for each connection. When TCP determines congestion is likely, TCP reduces both traffic, as well as retransmissions, exponentially. When a connection starts, or after a period of congestion, TCP uses the slow-start algorithm in conjunction with other congestion avoidance algorithms to limit increasing transmit limits too quickly, which Would result in more congestion. These algorithms work quite well after a TCP connection has been established and operational for a while. However, typical user traffic (like the HTTP traffic generated when surfing the Internet) starts numerous short-lived TCP connections. The server's TCP implementations have to re-adapt on each successive connection. This can cause periods of brief congestion due to retransmits.

As a result of all of the above considerations, a remote user connected over a low speed link to a high speed network such as the Internet experiences markedly slower transfer of data then that theoretically achievable, resulting in inconvenience, annoyance and frustration. Furthermnore, if the user continues to initiate short-lived TCP connections, the problem is only exacerbated by causing additional congestion and transmission of relatively large numbers of redundant packets. Consequently, the bandwidth of the low-speed link between the remote terminal and the network access server is very inefficiently utilized, exacerbating the problem of the user experiencing poor quality of remote access service. These problems are particularly acute for persons using conventional analog lines to access the network. Heretofore, persons working in the art have not succeeded in satisfactorily addressing all of these issues.

It is an object of the invention to address, at least in part, these problems and improve the efficiency and throughput of data through a device such as a network access server providing an interface between two networks (such as the PSTN and a high speed packet switched network) which are subject to differences in their respective nominal nominal transmission rates. The present invention is particularly suitable for use in network access servers or other nodes that provide an interface between a relatively slow transmission medium and a relatively fast transmission medium, such as a server providing network access for users dialing into a high speed IP network such as an Ethernet network or Internet over a voice grade analog telephone circuit.

SUMMARY OF THE INVENTION

A method is provided for increasing the throughput of data through a device providing an interface between a telephone line and a data network. For example, the method may increase the throughput through a network access server maintained by an Internet Service Provider, with the network access server providing Internet access for remote terminals over the public switched telephone network.

The method comprises the step of first receiving a packet of data from the high speed network at the interface. The packet will typically be placed in a queue for processing, the queue referred to herein alternatively a "first queue" or "queue A". The packet of data may be for example a packet of data from a host computer on the Internet en route to the remote terminal. The network access server then determines if the packet of data is a duplicate of a packet previously forwarded across the interface to the recipient of the packet, such as a retransmission of the packet. The network access server drops the packet if the packet is a duplicate of a packet previously forwarded across the interface or already present in the queue, rather than queuing it for transmission. Several techniques for determining whether the packet is a redundant/retransmitted packet are described. Almost certainly, had this packet been transmitted the packet would have been dropped upon receipt by the remote terminal as a duplicate. This is an expensive waste of bandwidth at the portion of the packet path that can least afford it. The method will typically require that the link layer protocol (e.g. PPP) track which TCP packets have yet to be transmitted via the modem in the network access server to the remote terminal, so as to ensure that non-redundant packets are not dropped and provide a mechanism for determining whether the packet is a redundant or retransmitted packet or not.

As an alternative or second embodiment (which may be practiced alone or in conjunction with the above first method), the network access server maintains a second queue, referred to herein alternatively as "queue B" for packets en route through the interface from the remote terminal to the host system on the network. Every packet going from the remote terminal (i.e, the PPP link) to the host computer system (i.e., the high speed WAN/LAN, e.g. Ethernet) link is placed in the second queue. The method involves examining the TCP acknowledge sequence number of the packets in the "queue B" being sent to the host system on the network. The method further involves looking at the packet sequence numbers for packets in the first-queue ("queue A"). The method takes advantage of the fact that the packets in the second queue will contain an acknowledgement sequence number (referred to as ACK herein) indicating which packets have been received by the remote terminal. If a packet is present in queue A for which an acknowledgment that such packet has already been received exists (determined from inspection of the acknowledge sequence numbers of the packets in the second queue), then the packet in queue A can be safely dropped.

Alternatively, and more preferably, the data portion of the packet in queue A is dropped and only the packet header, including the acknowledge sequence number, is sent. This is because the header may contain new, i.e., not previously received, information, e.g., acknowledgement information, that the other end may need to operate in accordance with a communications protocol such as TCP. Furthermore, the number of bytes needed for the header it typically minimal compared to the amount of bytes devoted to the data or payload portion of the packet. Therefore substantial savings of bandwidth will still be obtained in the situation in which the redundant data is dropped by the header with a payload of zero bytes (a valid packet) is sent.

The method may also be done in a manner in which information is stored as to which packets have already been transmitted across the interface. Instead of merely dropping duplicates of packets that happen to be present in the first queue at the same time, any packet in the first queue for which an acknowledgement has already been received is automatically dropped. This would typically require a storing of the packet sequence numbers for the acknowledged packets in a memory, continually updating the memory as new acknowledgements are received, and then checking the packets in the first queue to determine whether an acknowledgement for the packets in the queue has been received. If so, the packet is dropped. Again, in this method the entire packet may be dropped, or, more preferably, the data portion of the packet is dropped and only the header for the packet is transmitted as an acknowledgement packet.

Any or all of the above methods prevent re-transmitting data, or entire packets, over the slow PPP link connecting the network access server to the remote terminal. Moreover, the method, in particular the second embodiment, prevents the remote terminal's TCP state machine from thinking that it's ACKs are not-getting through the telephone or data networks to the host system, and therefore prevents it from going into a congestion control mode. The congestion control mode is a back-off algorithm that will slow down the packet stream over the PPP link to the network access server and host system by causing the remote terminal to reduce its packet flow. By preventing the remote terminal from going into congestion control mode, the throughput is further improved.

Further details on these and many other aspects of the present invention will become apparent from the following detailed description of a presently preferred embodiment of the invention.

BRIEF DESCRIPTION OF THE DRAWINGS

Presently preferred forms of the invention are depicted in the drawings, where like reference numerals refer to like elements in the various figures, and wherein:

FIGS. 3A–3D illustrate a presently preferred software routine for processing the packets in the two queues of FIG. 1 in a network access server;

In FIGS. 5A–5D, the numbers 106, 107, 108 etc. in Queue A are used, in a somewhat simplified manner, to represent TCP transmission sequence numbers for the bytes of the data in the sender's byte stream, and not packet sequence numbers in an absolute sense, in order to more clearly and simply illustrate the dropping of redundant packets feature of the present invention. At the present time there is no absolute ordering of packets with a "packet number", and the sequence number field in TCP is the next best thing, i.e., a field that identifies the position in the sender's byte stream of the data in the packet. The numbers 106, 107 and 108 are thus used as a shorthand for positions in the sender's byte stream that the data in the packet belongs to. Persons skilled in the art will appreciate that the actual TCP sequence numbers will have a different form, but the concept is the same. Similarly, the numbers 101, 102, 103 etc. in Queue B in FIGS. 5A–5D are intended to represent TCP acknowledgement numbers in a somewhat simplified fashion and, in practice such numbers may have a different form in accordance with the TCP protocol. In the TCP protocol the actual acknowledgement numbers identify the number of the octet of data that the sender expects to receive next, and thus will generally have a different from than "101" or "103", but the principle is the same.

DETAILED DESCRIPTION OF THE PREFERRED AND ALTERNATIVE EMBODIMENTS OF THE INVENTION

Figure 1:
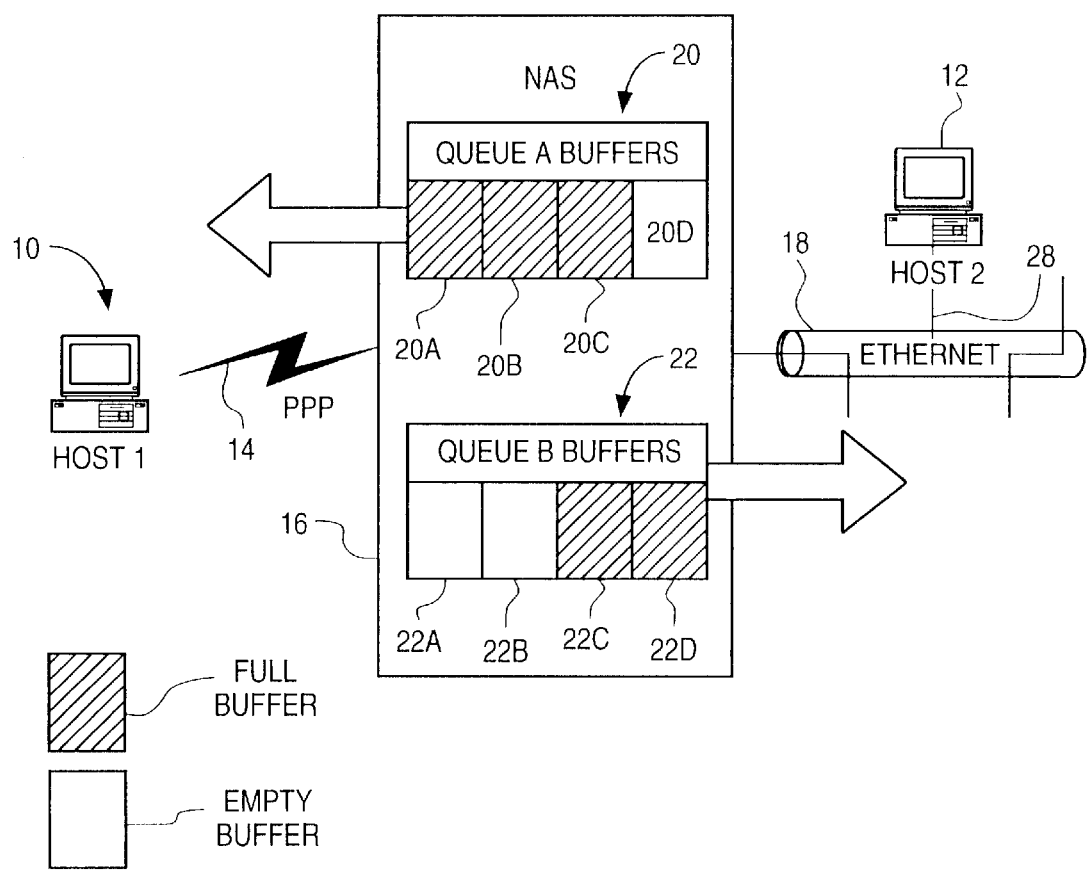
FIG. 1 is a simplified illustration showing the placing of packets going through a node such as a network access server into two queues in order to determine which packets to drop, with one queue for packets en route from a host source of data to a remote terminal over a public switched telephone network and being subject to the controlled dropping of packets, with the other queue for packets en route from the remote terminal to the host source of data on a data network.

Referring now to FIG. 1, a method is provided for increasing the throughput of data through a device such as a network access server NAS 16. The network access server 16 provides an interface between a first, relatively high speed network 18 such as an Ethernet local area network 18, and a second, relatively slower network 14 such as the Public Switched Telephone Network (PSTN). In the example of FIG. 1, a user operating computer 10 connects via a modem and PSTN network 14 to NAS 16, which provides access to the network 18. The nature or type of network 18 is essentially unimportant, and could be a corporate network, Internet Service Provider backbone network, Internet, or otherwise. Intermediate networks may be present as well. In a typical remote access exarnple, the user operating computer 10 wishes to exchange data or download files from a second computer 12 on the network 18.

The first and second networks 18, 14 will ordinarily have different nominal transmission rates. For example, the connection on the PSTN network 14 may be a PPP connection in which data is transmitted to the user 10 at 28.8 or 56 Kbps over an analog telephone line. The data transmission rates on the second network 18 will be much faster, such as a 10 Mbps. As such, the bandwidth on the low speed network 14 needs to be conserved as much as possible. In accordance with a principal aspect of the invention, this conservation of bandwidth and corresponding increased throughput across the NAS 16 is accomplished by dropping redundant (e.g., retransmitted) packets from the host computer 12 on the network 12 and destined for transmission over the slower network 14. The present invention provides several techniques for determining whether a packet arriving at the NAS 16 is a redundant or retransmitted packet and therefore need not be transmitted over the low speed network 14 to the user's computer 10. The dropping of the redundant packets conserves precious bandwidth over the lower speed network 14. This results in higher throughput across the device 16.

The dropping of redundant packets may consist of deleting the packet entirely, or, more preferably, dropping the data portion of the packet and sending the packet header only as an acknowledgement packet. The header may contain new information such as acknowledgement information, and therefore may be needed by the far end. Furthemore, the data or payload of the packet is typically requires many more bytes of information than the header so a savings in bandwidth is still realized. In this document, the term "dropping redundant packets" or "dropping the packet" is intended to mean either deleting the packet entirely, or deleting the data portion of the packet and transmitting the header. In either case, the prior art situation of wasting of bandwidth over the low speed link by transmission of redundant data is ameliorated. In practice, it may be preferable to continue to transmit the header of the packet since the header will contain a TCP acknowledgment number or other information that may be needed by the remote end on the low speed link.

Additionally, the dropping of redundant packets not only prevents re-transmitting packets over the slow PPP link, but stops the TCP state machine in the remote computer 10 from thinking that it's ACKs aren't getting through the networks 14, 18 to the computer 12 and therefore going into congestion control mode. The congestion control mode is a backoff algorithm that will slow down the packet stream over the PPP link 14 to the computer 12 by causing the remote computer 10 to reduce its packet flow.

While the device 16 providing the packet-dropping feature in the preferred embodiment is a network access server, or any other suitable type of device that provides an interface between a faster network and a slower network may be used, such as a router. In a preferred embodiment, the device 16 providing the interface between the first and second networks comprises a network access server, such as a device of the general type described in the above-referenced Walsh et al. '595 patent and available from companies such as 3Com Corporation (e.g., the Total Control Enterprise Network Hub product), Ascend Communications, Lucent Technolgoies and others. The NAS provides simultaneous network access for a plurality of remote users, and the packet dropping methods of the present invention are performed in the NAS in parallel for each communication session active within the device. Preferably the invention is implemented in hardware in an Application Specific Integrated Circuit (ASIC). Software implementations are of course possible.

The first network 18 will typically comprises a packet-switched network such as a local or wide area IP network, e.g., an Ethernet corporate network, ISP backbone network or Internet, and the said second network comprises a PSTN, ISDN or cellular telephone network. However, the type of network is not particularly important. Furthermore, the nature and type of the terminals 10 and 12 is obviously not important and may be any type of data terminal equipment.

In accordance with one embodiment of the invention, the method of dropping redundant packets comprises the steps of receiving a packet from a source of data 12 at the device 16 providing the interface, with the packet transported along the first, relatively high speed network 18. The device 16 then determines if the packet is either a duplicate of a packet previously forwarded across the interface and onto the second network 14 for transmission to the remote computer 10, or a duplicate of a packet already received but not yet forwarded. If the packet is a duplicate of a packet previously forwarded or already received but not yet forwarded, then the packet is dropped entirely, or more preferably the data portion of the packet is dropped. Several examples of software-based processing routines are described below for determining whether the arriving packet is a duplicate of a packet previously forwarded across the interface or already received.

One way of determining whether the packet arriving at the device 16 is a redundant packet and should be dropped is by placing the packets en route from the first network 18 to said second, slower network 14 in a queue. In the example of FIG. 1, a queue 20, referred to herein as "queue A" or the "first queue", stores packets from the host 12 destined for the remote computer 10. The queue has buffers 20A, 20B, 20C and 20D, of which buffers 20A, 20B, 20C are full of packets, and buffer 20D is empty and awaiting the receipt of another packet from the host computer 12. Each of the packets in the queue 20 has a packet sequence number in a header or field of the packet. The device 16 implements a software routine (or ASIC) that checks the packet sequence number of the packets in the queue 20 and drops packets from the queue 20 which have the same packet sequence number (e.g., retransmitted packets). The queue may be implemented in a memory in a suitable card or module in the device, such as in the network interface card providing the interface to the higher speed network 18, or as a software structure in the card. This is an implementation detail that is not considered important to the overall inventive concept and is a matter of design choice to a person skilled in the art.

As an alternative, the method may be performed by implementing two queues for packets being directed through the device 16 from the remote computer 10 and the host computer 12. Queue A 20 stores the packets en route from the high speed network 18 to the low speed network. A second queue, "queue B" 22, stores packets that arrive from the slower speed network 14 and destined for the host computer 12 via the high speed network 18. The packets stored in the second queue 22 are packets that contain acknowledgement numbers in their headers, which identify the number of the octet that the remote end expects to receive next, and thus that indicate the packet sequence numbers for packets which were successfully received by the remote computer 10. Again, queues A and B could be implemented in any convenient fashion in hardware or software in the device 16.

In accordance with this second embodiment, packets en route from the source of data 12 on the high speed network 18 to the remote terminal 10 are placed in the first queue 22. These packets in the first queue have packet sequence numbers. Packets en route from the remote terminal 10 to the high speed network 18 are placed in the second queue 22. These packets have an acknowledge sequence number indicating the receipt of a packet from the source 12, e.g., a TCP ACK sequence number. The device 16 implements a software program that examines the acknowledge sequence numbers and determines the highest acknowledge sequence number for all of the packets in the second queue 22 and stores this value.

The software routine then compares the packet sequence numbers of the packets in the first queue 20 with the highest acknowledge sequence number. Based on the comparison, the software routine determines whether to drop a packet from the first queue 20. The step of dropping is performed if a packet in the first queue has a packet sequence number that is lower than or equal to the highest acknowledge sequence number. This is because if the remote terminal 10 has already acknowledged receipt of a packet with a given packet sequence number, e.g., 55, it has already successfully received all packets with a packet sequence number of 55 or below. Thus, any packet in the first queue 20 that has a packet sequence number of 55 or below has already been received, and therefore can be safely dropped. The number in this example, "55", is chosen in a simplified manner to illustrate the point, but in actual practice may be a number representing a particular octet of data that is expected to be received next, or a particular segment of data in the source's byte stream, or it make take still some other form. Obviously, the operation of the invention is not dependent on a particular form or representation of the sequence number or acknowledgement number.

The above process is performed substantially continuously during the duration of a communication session between the two terminals 10 and 12. As new packets are placed in the first queue, the software routine checks to see if it has the same packet sequence number as another packet already in the queue, and if so it is dropped. In an embodiment in which the two queues are implemented, the software (or ASIC) will compare the packet sequence number with the highest acknowledge sequence number and drop the new packet if the packet sequence number is equal to or less, than the lowest acknowledge sequence number. Additionally, in this latter embodiment, as new packets are placed in the second queue 22, the software will examine the packets in the second queue 22 and update the highest acknowledge sequence number, and use the updated highest acknowledge sequence number when examining the packets in the first queue 20. This process will be performed continuously in real time during the communication session. Furthermore, this process will be performed in parallel for all communications sessions that are currently active in the NAS 16.

Thus, it will be appreciated that we have described a method for increasing the throughput of data through a device 16 providing an interface between a first network 18 and a second network 14, comprising the steps of:

receiving a first packet at the device 16, said packet generated by a source of data 12 connected to the first network 18 and directed to a remote terminal 10 connected to the second network 14, with the first packet having a packet sequence number;

receiving a second packet at the device 16, the second packet generated by the remote terminal 10 and destined for the computer 12, with the second packet comprising an acknowledge sequence number indicating the receipt of a packet from the host source of data 12;

comparing the acknowledge sequence number with the packet sequence number; and dropping the first packet if the comparison of the acknowledge sequence number with the packet sequence number indicates that the first packet has been received by the remote terminal 10. While in a preferred embodiment the method is performed using the two queues 20 and 22 shown in FIG. 1, this is not absolutely essential and the dropping could be performed before the packet from the computer 12 is queued for transmission over the low speed network 14.

In yet another aspect of the invention, a method is provided for increasing the throughput of data through a device 16 providing an interface between a first network 18 and a second network 14. The method comprises the steps of:

(1) receiving a plurality of data packets at the device 16 and placing the packets in a queue 20, (2) setting an expected transmission sequence number for the queue 20 equal to the lowest packet sequence number of all of the packets in the queue 20; and (3) processing a packet placed into the queue 20 to determine whether the packet has already been transmitted to the remote terminal 10.

In this embodiment, the step (3) of processing the packet includes the steps of (a) comparing the packet sequence number of the packet with the expected transmission sequence number, and (b) dropping the packet if the packet has a packet sequence number equal to the expected transmission sequence number, and if another packet is present in the queue 20 with a packet sequence number equal to the expected transmission sequence number. If the packet is not dropped, it is forwarded across the interface. In a preferred embodiment, packets en route from the remote terminal 10 to the computer 12 and arriving at the device 16 are placed in a second queue 22. The device implements a software program that determines a highest acknowledge sequence number for all of the packets in the second queue. The software then compares the packet sequence numbers of the packets in the first queue with the highest acknowledge sequence number. If the transmission sequence number of any packet in the first queue 20 is lower or equal in value to the highest acknowledge sequence number, then such packet(s) in queue A are dropped.

Figure 2:
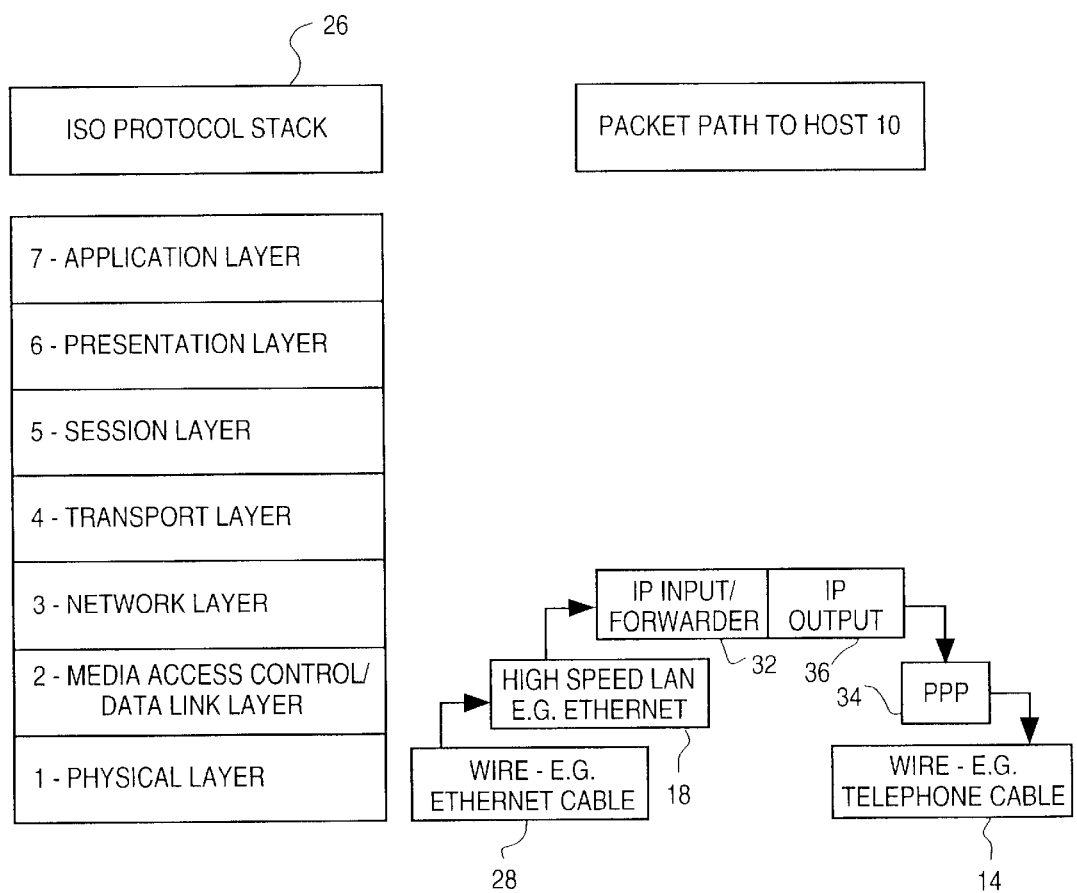
FIG. 2 is an illustration of the ISO protocol stack model for the network access server of FIG. 1, showing protocol layers involved in the packet path from the computer on the network to the remote terminal of FIG. 1.

FIG. 2 is an illustration of the ISO protocol stack model for the network access server 16 of FIG. 1, showing protocol layers involved in the packet path from the computer 12 on the network 18 to the remote terminal 10 of FIG. 1. Referring to both FIGS. 1 and 2, the computer 12 is connected to the Ethernet network by an Ethernet cable 28 corresponding to the physical layer in the ISO model 26. The packets are transported along the network 18, where Layer 2 (Media Access Control and Data Link layer) protocols are implemented. When the packets arrive at the NAS 16, network layer protocols are processed by a suitable network layer protocol stack in the NAS 16. These processes include an IP input/forwarded process 32 and an TP output process 34. The dropping of the redundant packets occurs in the IP output process 34, before the packets are forwarded to modem modules in the NAS which implement PPP level processing 36. After performing the PPP processing 36, the packets are placed on the telephone line for transmission to the remote terminal 10 over the PSTN 14.

In a preferred embodiment, elimination of duplicate packets must occur in the device 16 prior to encapsulating the data with a protocol which requires that ordering of packets be maintained. Dropping packets after they have been encapsulated by PPP is not desirable, as this interacts with VJ-Compression and some forms of PPP-compression (like those provided by Microsoft, or STAC). Therefore the elimination of duplicate packet occurs in the IP output function 34 in FIG. 2. The preferred embodiment of this method is to have the network layer protocol packet handler software search for duplicate transmissions in the TCP transport layer (ISO level 4) and eliminate the duplications by dropping these packets prior to them being given to the link layer protocol, PPP.

Referring now to FIGS. 3A–3D, a presently preferred procedure for determining whether a particular packet is a potential retransmission or otherwise a redundant packet and can be deleted will be described. In a preferred embodiment the algorithm is implemented as a part of the IP output process or routine 34 of FIG. 2, and typically in the card or module in the device 16 that provides the interface to the high speed network.

Referring to FIG. 3A, the process starts by step 40 of receiving a packet from the high speed network 18. The software routing then asks the question at step 42 of whether the packet is of the protocol type that uses retransmissions. This can be determined by examination of the packet in question. If the type of protocol is one in which no retransmissions are used, then it is presumably not a redundant packet and is queued for transmission at step 44. If the protocol does use retransmissions (e.g., TCP), the software asks the next question at step 46 of whether the packet is destined for transmission over an interface that is running the inventive method. If not, the packet is queued for transmission at step 48. Presumably the answer to the question at step 46 is yes, and so the process proceeds to step 50: does the interface have queued data of the same protocol type. Again, if the answer is no, the packet is queued for transmission. If yes, the packet is placed in Queue A (20 in FIG. 1) and the process proceeds to the steps shown in FIG. 3B. As indicated by the arrow 53, if the process aborts in step 44, 48 or 52 by queuing the packet for transmission, the process goes back to step 40 and a new packet is processed.

The steps in FIG. 3B consist of process that is part of the process to determine whether to drop the packet. The steps assume that two queues A and B as shown in FIG. 1 are implemented in the network access server 16, and that packets arriving at the Network access server 16 from the remote terminal 10 are placed in the second system queue B 22 of FIG. 1. The process continues at step 54 with the step of identifying all queued packets in the system queue A which correspond to that same transport flow based on the addressing information associated in the packet (e.g., the destination address for the remote computer. Then, the process proceeds to step 56, identifying all queued packets in the system queue B which correspond to that same transport flow based on the addressing information associated in the packets (e.g., by inspection of the source address in the packet, the IP address of the remote computer).

Next, at step 58, the software has a variable referred to herein as the "expected transmission sequence number" for the packets in queue A 20. Given that the remote terminal 10 is the destination of the flow of packets in queue A, the program sets the expected transmission sequence number variable in queue A equal to the lowest packet sequence number of all packets identified in step 54. Next, at step 60, the software has a second variable referred to herein as "the acknowledge sequence number" for the packets in queue B. At step 60, the software looks at the packets in queue B, and sets the acknowledged sequence number of the flow to remote computer 10 equal to the highest acknowledgement sequence number of all of the packets in queue B identified in step 56.

Then, at step 62, the software perform the normal receive processing (e.g., TCP/IP processing) of all packets identified in steps 54 and 56.

Figure 3C:
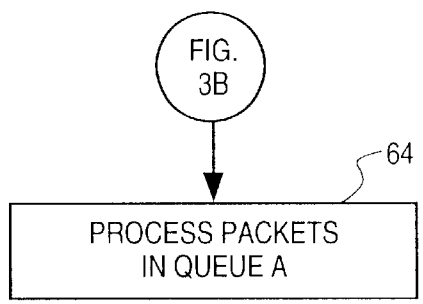

The process then proceeds to the steps shown in FIG. 3C. In FIG. 3C, the software implements a processing routine to determine whether the packet processed in the steps shown in FIG. 3A should be dropped. This step 64, in a preferred embodiment; consists of the sub-steps shown in FIG. 3D.

Figure 3D:
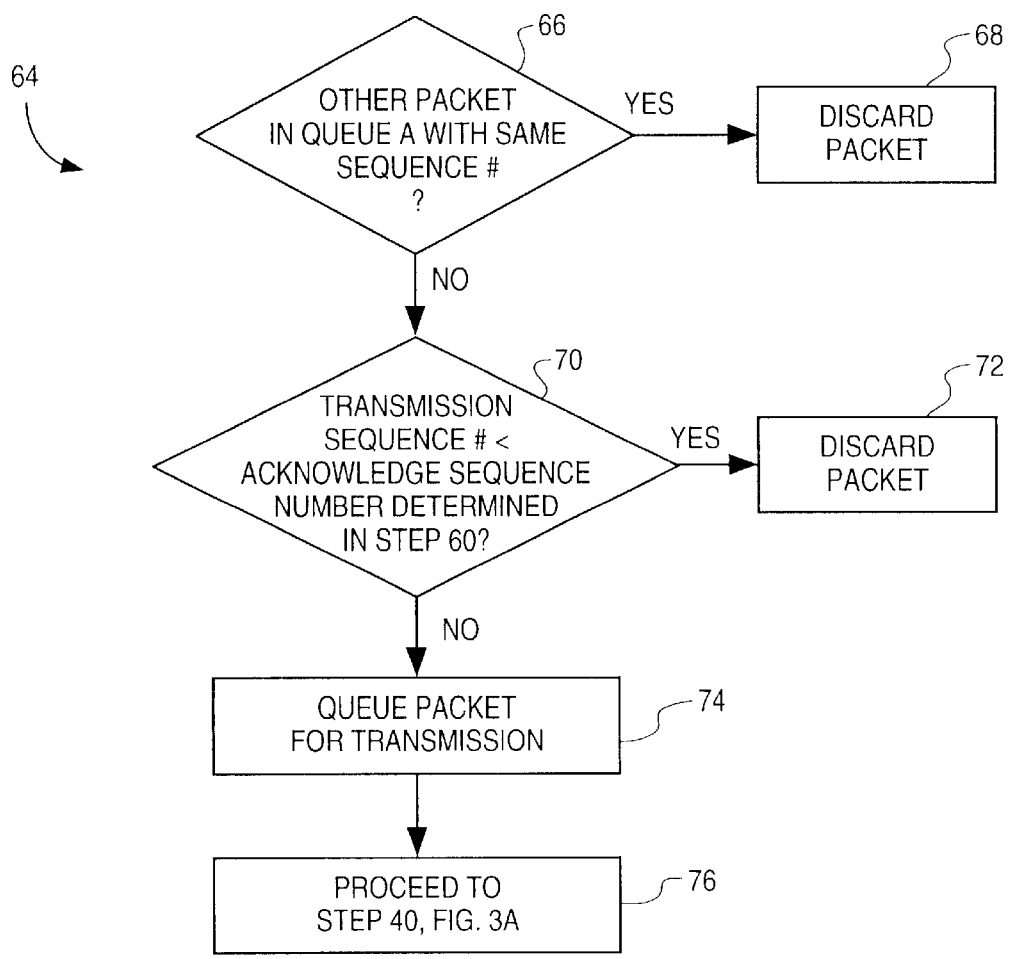

Referring to FIG. 3D, at step 66, if it is determined that the packet in question is indeed a duplicate packet because more than one packet is found in queue A with the same transmission sequence number, then the packet is discarded as indicated at step 68. If more than one duplicate is found in queue A, then all such duplicates in queue A are discarded.

If the packet is not a duplicate of another packet in queue A, then it still may be a packet that is redundant or retransmitted and already received by the remote terminal. Thus, the process proceeds to step 70, which asks whether the transmission sequence number of the packet in question is lower or equal in value to the acknowledgement sequence number determined in step 60. If so, then the packet is discarded at step 72. Otherwise, as indicated at step 70, the packet is queued for transmission and the process reverts back to the beginning at step 40 in FIG. 3A and the next incoming packet is processed.

At step 70, the process may be implemented such that all the packets in queue A (and not just the packet in question) are inspected and all packets in queue A having a packet sequence number less than or equal to the highest acknowledge sequence number are dropped. Again, this step of dropping could be either the dropping of the entire packet, or just the data portion of the packet.

Furthermore, the process illustrated in FIGS. 3A–3D assumes that the variable for the highest acknowledge sequence number is continuously updated as new packets are received by the remote terminal and placed into queue B.

Figure 4:
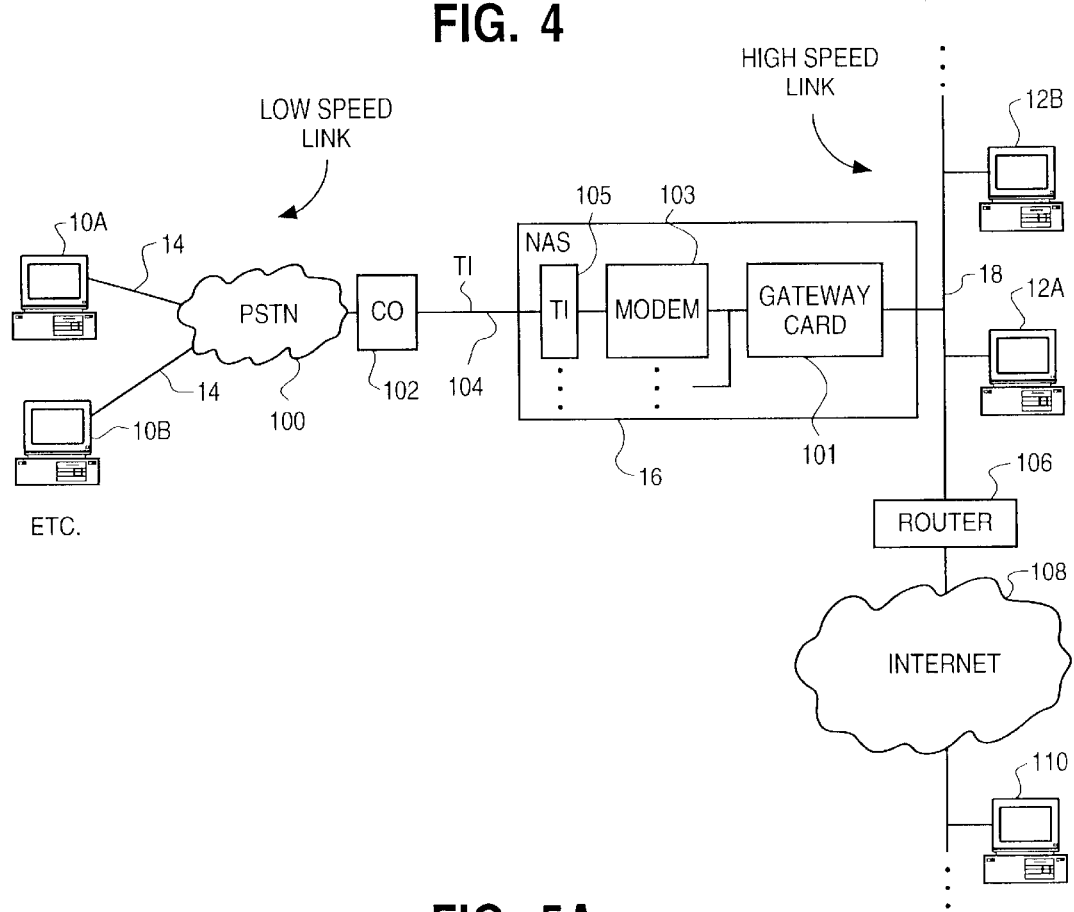
FIG. 4 is an illustration of a representative example of the telecommunications environment in which the invention may be practiced.

Referring now to FIG. 4, a representative embodiment in which the invention may be practiced is illustrated schematically. In the example of FIG. 4, two remote computers 10A and 10B are linked via analog telephone lines 14 to the PSTN network 100. The calls are directed to a telephone company central office 102 where the calls are multiplexed on a T1 digital telephone line 104 for transmission to the network access server (NAS) 16. The network access server is shown somewhat simplified in block diagram form, with the details thereof known to persons skilled in the art and described in the patent literature (see e.g. the Walsh et al. patent cited above). The NAS 16 includes a telephone line interface card set 105, a modem card 103 (in which multiple modems are typically implemented), and a gateway module or card 101, such as the EdgeServer card or the HyperArc routing cards, both commercially available from 3Com Corporation. Functionally equivalent cards and modules are implemented in other network access servers available from companies such as Ascend and Lucent Technologies (successor to Livingston Enterprises, Inc.). The gateway card 101 includes suitable communications software including TCP/IP protocol stacks which provide the necessary protocol processing to allow data to be routed onto the network 18 and allow bilateral communications between the remote users 10A and 10B and the computers or other data terminals 12A, 12B on the network 18. The device 16 includes a network layer protocol software module processing a network layer protocol for the packets, and a link layer protocol software module processing a link layer protocol for the piackets. The network layer protocol software (e.g., IP protocol stack) performs the steps of comparing the packet sequence numbers as described herein and dropping of redundant packets prior to the processing of the link layer protocol by the link layer protocol software module (e.g., PPP module).

In the example of FIG. 4, the network 18 includes a router 106 that connects network 18 to the Internet 108 and allows the remote terminals 10A and 10B to connect with remote computers 100 and other computers or servers (e.g., computer 110) connected to the Internet. In the illustration, the computer network 18 is characterized as having much faster transmission rates that the low speed dial up PPP connections linking the remote computer 10A and 10B to the NAS 16. Thus, the packet dropping routine is performed in the NAS for each communication session occurring in the NAS. 16. Thus, for the session between computer 10A and computer 12A, the dropping of redundant or retransmitted packets is performed. Meanwhile, a session between remote computer 10B and computer 12B on the network 18 (or with computer 110) is occurring. The procedure illustrated in FIGS. 3A–3D is preferably implemented in a fashion such that the dropping of redundant packets is performed for both sessions simultaneously. This can be accomplished such as by steps 54 and 56 identifying the session for each incoming packet, keeping the sessions logically separated, and performing the processing steps 58, 60, 62 64, 68, 70, 72 and 74 in parallel for each session.

Figure 5A:
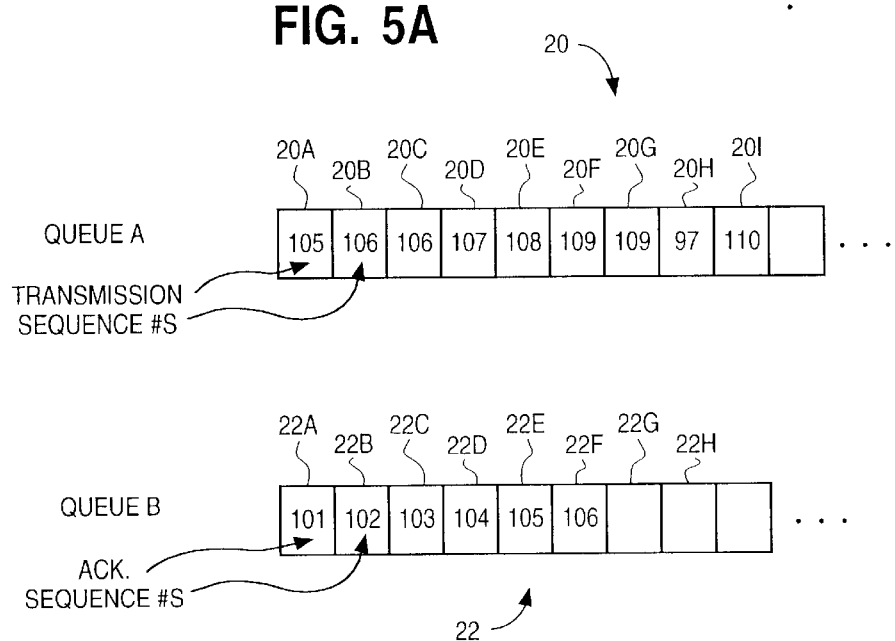
FIGS. 5A–5D illustrate the contents of two queues, queue A and queue B, of the type shown in FIG. 1, in successive instants of time, showing how redundant packets in queue A are dropped based on the packet sequence numbers and acknowledge sequence numbers of the packets in the two queues, in accordance with the packet processing procedure illustrated in FIG. 3D.

FIGS. 5A–5D show a simplified example of how the process of FIGS. 3A–3D would work to drop redundant packets. FIG. 5A shows queues A and B, 20 and 22, respectively, as a given instant of time for single communications session.

In FIGS. 5A–5D, the numbers 105, 106, 107, 108 etc. in Queue A are used, in a somewhat simplified manner, to represent TCP transmission sequence numbers for the bytes of the data in the sender's byte stream, and not packet sequence numbers in an absolute sense, in order to more clearly and simply illustrate the dropping of redundant packets feature of the present invention. At the present time there is no absolute ordering of packets with a "packet number", and the sequence number field in TCP is the next best thing, i.e., a field that identifies the position in the sender's byte stream of the data in the packet. The numbers 105, 106, 107 and 108 etc. are thus used as a shorthand for positions in the sender's byte stream that the data in the packet belongs to. Persons skilled in the art will appreciate that the actual TCP sequence numbers may have a different form, but the concept is the same. Similarly, the numbers 101, 102, 103 etc. in Queue B in FIGS. 5A–5D are intended to represent TCP acknowledgement numbers in a somewhat simplified fashion and, in practice such numbers may have a different form in accordance with the TCP protocol. In the TCP protocol the actual acknowledgement numbers identify the number of the octet of data that the sender expects to receive next, and thus will generally have a different from than "101" or "103", but the principle of operation is the same.

Queue A has a buffer 20A, containing a packet with a packet sequence number of 105, a buffer 20B with a packet sequence number of 106, and so on. Note the redundant packets in buffers 20B and 20C, and 20F and 20G. Queue B has packets having acknowledge sequence numbers of 101, 102, 103, 104, 105 and 106. In accordance with step 58 of FIG. 3B, the expected transmission sequence number for queue A is 105, which is the lowest packet sequence number for packets in the queue. In accordance with step 60, the acknowledge sequence number variable is set to 106, which is the highest sequence number for a packet in queue B.

Figure 5B:
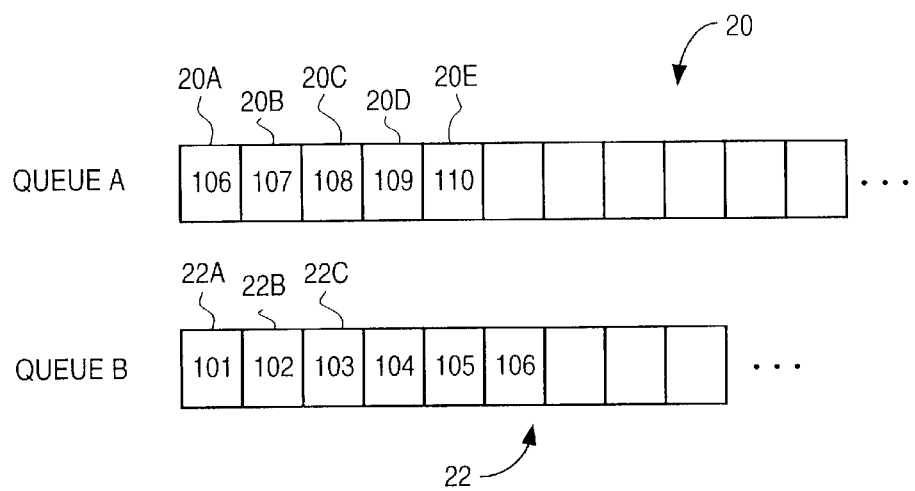

Then, in accordance with step 66 of FIG. 3D, the duplicates in queue A 20 are dropped, resulting in the queue A 20 shown in FIG. 5B. Since the packets in queue A with the sequence numbers of 97 and 105, (FIG. 5A) have a packet sequence number less than the acknowledge sequence variable (set to 106), they are dropped, in accordance with steps 70 and 72 of FIG. 3D. In an embodiment in which only the data contained in redundant packets is dropped, the packet with packet sequence number 97 would have the data portion of the packet dropped but the header would still be transmitted, in which case buffer 20H would still contain the header for the packet. Similarly, only the data portion of the packet with the packet sequence number of 105 would dropped and the header transmitted.

Figure 5C:
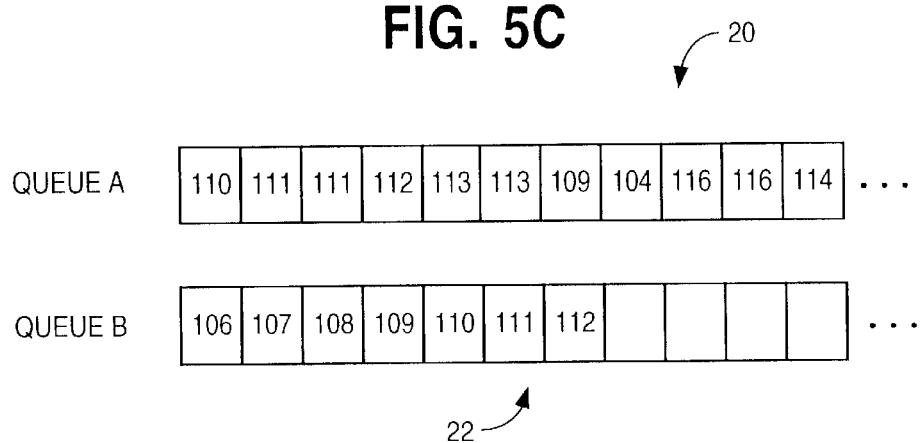
Figure 5D:
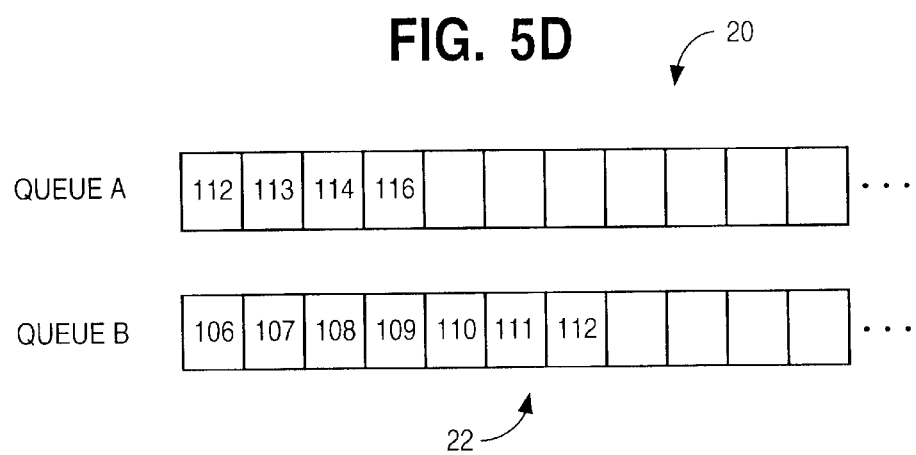

At some later point in time queues A and B contain packets as shown in FIG. 5C. In accordance with steps 66–72 of FIG. 3D, the duplicate packets in queue A are dropped (packets with packet sequence. numbers 111, 113 and 116), and the packets with a packet sequence value lower than 112 are also dropped (the packet with sequence numbers 110, 111 and 104). This process results in the arrangement of queue A as shown. in FIG. 5D. In an embodiment in which only the data contained in redundant packets is dropped, the packets with packet sequence number 104, 111, 113 and 116 would have the data portion of the packets dropped, but the headers would still be transmitted, in which case respective buffers would still contain the header for these packets.

As indicated above, the process is essentially continuous for each communications session in the NAS 16. Further, some minimal buffering should be employed within the low-speed dialup interface driver in the modem module 103 of FIG. 4.

Finally, this invention is particularly suitable for dialup routers, such as are implemented in software and hardware in the EdgeServer card of 3Com Corporation's Total Control Enterprise Network Hub, which provide quality of service (QOS) for PPP links. Providing such service means that the devices would have to perform Layer-3 packet queuing above PPP to minimize forwarding latency. Also, newly proposed QoS schemes in the IETF Differential Services Working Group utilize packet dropping against flows to shape the flows. Therefore this invention will be especially useful as these services are rolled out in the future.

Persons skilled in the art will appreciate that considerable variation from the presently preferred embodiments of the invention may be made without departure from the true scope and spirit of the invention. Persons of skill in the art will be readily able to write code to modify a TCP stack or other software to drop packets in accordance with the teachings herein. Further, as noted above, the terms "dropping packets", "dropping redundant packets," and the like in the specification, and in the appended claims, are intended to cover both the situation in which the packets are dropped entirely, and the situation in which the data portion of the packet is dropped but the header portion of the packet is retained and transmitted. This true scope and spirit is to be found by reference to the appended claims, interpreted in light of the foregoing specification.

We claim:

1. A method for increasing the throughput of data through a device providing an interface between a first network and a second network, comprising the steps of:

receiving a packet from a source of data at said interface, said packet transported along said first network;

determining if said packet either contains data previously forwarded across said interface and onto said second network for transmission to a recipient of said packet, or else data already received in said device but not yet forwarded;

dropping said packet if said packet contains data either previously forwarded across said interface or already received but not yet forwarded;

placing packets en route from said source of data on said first network to said recipient in a first queue in said device, said packets in said first queue having a packet sequence number;

placing packets en route from said recipient to said source of data in a second queue in said device, said packets en route from said recipient to said source of data containing an acknowledge sequence number;

determining a highest acknowledge sequence number for all of said packets in said second queue;

comparing said packet sequence numbers of said packets in said first queue with said highest acknowledge sequence number; and determining whether to drop a packet from said first queue, the step of dropping being performed if a packet in said first queue has a packet sequence number lower than said highest acknowledge sequence number.

2. The method of claim 1, wherein said first network comprises the Internet and wherein said second network comprises a public switched telephone network.

3. The method of any one of claims 1 and 2, wherein said packet comprises a header portion and a data portion, and wherein said step of dropping said packet comprises the step of dropping said data portion of said packet but not dropping said header portion.

4. The method of claim 1, wherein said method is performed in a network access server comprising a telephone line interface module providing an interface to a public switched telephone network, and a gateway module providing an interface to said first network, wherein said first network comprises a packet-switched network, and wherein said network access server drops packets that are retransmitted from said source of data to said recipient so as to reduce the amount of data transmitted to said recipient over said public switched telephone network.

5. The method of claim 1, wherein said steps are performed substantially continuously during the duration of a communication session between said source of data and said recipient.

6. The method of claim 1, wherein the method further comprises the steps of:

checking the packet sequence number of said packets in said first queue; and deleting packets in said first queue which have the same packet sequence number.

7. The method of claim 1, wherein said interface further comprises a network layer protocol software module processing a network layer protocol for said packets, and a link layer protocol software module processing a link layer protocol for said packets, and wherein said network layer protocol software performs said steps of determining and dropping prior to processing of said link layer protocol by said link layer protocol software module.

8. The method of claim 7, wherein said network layer protocol software module comprises an IP stack and wherein said link layer protocol software module comprises a PPP stack.

9. The method as claimed in any one of claim 1, 5, or 6, wherein said method is performed in a network access server and wherein said first network comprises a packet-switched network and said second network comprises a public switched telephone network.

10. The method as claimed in any one of claims 1, 5 and 6, wherein said method is performed in a network access server and wherein said first network comprises a packet-switched network and said second network comprises a public switched telephone network, and wherein said network access server performs said method simultaneously for a plurality of different communications sessions between a plurality of different recipients and a plurality of different sources of data on said packet switched network, thereby increasing the throughput of said communications sessions.

11. A method for increasing the throughput of data through a device providing an interface between a first network and a second network, comprising the steps of:

receiving a packet from a source of data at said interface, said packet transported along said first network;

determining if said packet either contains data previously forwarded across said interface and onto said second network for transmission to a recipient of said packet, or else data already received in said device but not yet forwarded; and dropping said packet if said packet contains data either previously forwarded across said interface or already received but not yet forwarded, wherein said method is performed in a network access server comprising a telephone line interface module providing an interface to a public switched telephone network, and a gateway module providing an interface to said first network, wherein said first network comprises a packet switched network, and wherein said network access server drops packets that are retransmitted from said source of data to said recipient so as to reduce the amount of data transmitted to said recipient over said public switched telephone network, and wherein said method further comprises the steps of:

(a) placing packets en route from said source of data on said packet switched network to said recipient in a first queue, said packets in said first queue having a packet sequence number;

(b) placing packets en route from said recipient to said source of data in a second queue, said packets en route from said recipient to said source of data containing an acknowledge sequence number indicating the receipt of a packet from said source of data;

(c) determining a highest acknowledge sequence number for all of said packets in said second queue;

(d) comparing said packet sequence numbers of said packets in said first queue with said highest acknowledge sequence number; and (e) determining whether to drop a packet from said first queue, the step of dropping performed if a packet from said first queue has a packet sequence number lower than or equal to said highest acknowledge sequence number.

12. The method of claim 11, wherein the method further comprises the steps of:

(f) checking the packet sequence number of said packets in said first queue; and (g) deleting packets in said first queue which have the same packet sequence number.

13. A method for increasing the throughput of data through a device providing an interface between a first network and a second network, comprising the steps of:

receiving a first packet at said interface, said packet generated by a source of data connected to said first network and directed to a remote terminal connected to said second network, said first packet having a packet sequence number;

receiving a second packet at said interface, said packet generated by said remote terminal and destined for said source of data, said second packet comprising an acknowledge sequence number indicating the receipt of a packet from said source of data;

comparing said acknowledge sequence number with said packet sequence number; and dropping said first packet if said comparison of said acknowledge sequence number with said packet sequence number indicates that data in said first packet has been received by said remote terminal, wherein said second packet is placed in a queue along with a plurality of other packets from said remote terminal, and wherein said step of comparing comprises the steps of determining a highest acknowledge sequence number for all of said packets in said queue and dropping said first packet if said packet sequence number indicates that data in said first packet has been received by said remote terminal.

14. The method of claim 13, wherein said first network comprises a packet switched network and said second network comprises a public switched telephone network.

15. The method of claim 13, wherein said method is performed in a network access server providing said interface between said first network and said second network.

16. The method of claim 13, wherein said first and second networks are characterized by having different transmission rates.

17. The method of claim 16, wherein said first network comprises a packet switched network and said second network comprises a public switched telephone network.

18. The method as claimed in any one of claims 13–17, wherein said packet contains a header portion and a data portion, and wherein said step of dropping comprises the step of dropping the data portion of said packet, with said header portion being transmitted to said remote terminal.

19. The method of claim 13, wherein said method is performed in a network access server comprising a telephone line interface module providing an interface to a public switched telephone network, and a gateway module providing an interface to said first network, wherein said first network comprises a packet-switched network, and wherein said network access server drops packets that are retransmitted from said source of data to said recipient so as to reduce the amount of data transmitted to said remote terminal over said telephone line interface module and said public switched telephone network.

20. The method of claim 13, further comprising the steps of:

placing packets en route from said first network to said second network in a queue;

checking the packet sequence number of said packets in said queue; and dropping packets from said queue which have the same packet sequence number.

21. The method of claim 13, wherein said device further comprises a network layer protocol software module processing a network layer protocol for said packets, and a link layer protocol software module processing a link layer protocol for said packets, and wherein said network layer protocol software performs said steps of comparing and dropping prior to processing of said link layer protocol by said link layer protocol software module.

22. The method of claim 21, wherein said network layer protocol software module comprises an IP stack and wherein said link layer protocol software module comprises a PPP stack.

23. The method of claim 13, wherein said steps of receiving a first packet, receiving a second packet, comparing and dropping are performed substantially continuously during the duration of a communication session between said source of data and said remote terminal.

24. The method of claim 13, wherein said method is performed in a network access server and wherein said first network comprises a packet-switched network and said second network comprises a public switched telephone network, and wherein said network access server performs said method simultaneously for a plurality of different communications sessions between a plurality of different remote terminals and a plurality of different sources of data on said packet switched network, thereby increasing the throughput of said communications sessions.

25. A method for increasing the throughput of data through a device providing an interface between a first network and a second network, comprising the steps of:

(1) receiving a plurality of data packets at said interface and placing said packets in a first queue, said plurality of packets including a first packet, said packets of data generated by a source of data connected to said first network and directed to a remote terminal connected to said second network, each of said packets of data having a packet sequence number;

(2) setting an expected transmission sequence number for said first queue equal to the lowest packet sequence number of all of said packets in said first queue; and (3) processing said first packet to determine whether data in said first packet has already been transmitted to said remote terminal, said step of processing comprising the steps of:

(a) comparing the packet sequence number of said first packet with said expected transmission sequence number, and (b) dropping data from said first packet if said first packet has a packet sequence number equal to said expected transmission sequence number and if another packet is present in said first queue with a packet sequence number equal to said expected transmission sequence number.

26. The method of claim 25, wherein said device comprises a network access server and wherein said first network comprises a packet-switched network and said second network comprises a public switched telephone network.

27. The method of claim 25, wherein said first network comprises the Internet and wherein said second network comprises a public switched telephone network.

28. The method of claim 25, wherein said method is performed in a network access server comprising a telephone line interface module providing an interface to a public switched telephone network, and a gateway module providing an interface to said first network, wherein said first network comprises a packet-switched network, and wherein said network access server drops retransmitted data from said source of data so as to reduce the amount of data transmitted to said remote terminal over said public switched telephone network.

29. The method of claim 25, wherein the method further comprises the steps of:

(4) placing packets en route from said remote terminal to said source of data in a second queue in said device, said packets en route from said remote terminal to said source of data containing an acknowledge sequence number indicating the receipt of a packet from said source of data;

(5) determining a highest acknowledge sequence number for all of said packets in said second queue;

(6) comparing said packet sequence numbers of said packets in said first queue with said highest acknowledge sequence number; and (7) determining whether to drop a packet from said first queue, the step of dropping performed if a packet in said first queue has a packet sequence number lower than said highest acknowledge sequence number.

30. The method of claim 25, wherein said steps are performed substantially continuously during the duration of a communication session between said source of data and said remote terminal.

31. The method of claim 25, wherein said interface further comprises a network layer protocol software module processing a network layer protocol for said packets, and a link layer protocol software module processing a link layer protocol for said packets, and wherein said network layer protocol software performs said steps of dropping prior to processing of said link layer protocol by said link layer protocol software module.

32. The method of claim 31, wherein said network layer protocol software module comprises an IP stack and wherein said link layer protocol software module comprises a PPP stack.

33. The method of claim 25, wherein said method is performed in a network access server comprising a telephone line interface module providing an interface to a public switched telephone network, and a gateway module providing an interface to said first network, wherein said first network comprises a packet-switched network, and wherein said network access server drops packets that are retransmitted from said source of data to said remote terminal so as to reduce the amount of data transmitted to said remote terminal over said public switched telephone network, and wherein the method further comprises the steps of:

placing packets en route from said remote terminal to said source of data in a second queue, said packets en route from said remote terminal to said source of data containing an acknowledge sequence number indicating the receipt of a packet from said source of data;

determining a highest acknowledge sequence number for all of said packets in said second queue;

comparing said packet sequence numbers of said packets in said first queue with said highest acknowledge sequence number; and determining whether to drop a packet from said first queue, the step of dropping performed if a packet from said first queue has a packet sequence number lower than said highest acknowledge sequence number.

34. The method as claimed in claim 29, wherein said method is performed in a network access server and wherein said first network comprises a packet-switched network and said second network comprises a public switched telephone network, and wherein said network access server performs said method simultaneously for a plurality of different communications sessions between a plurality of different remote terminals and a plurality of different sources of data on said packet switched network, thereby increasing the throughput of said communications sessions.

35. The method of claim 25, wherein said steps of receiving, setting and processing said first packet are performed substantially continuously during the duration of a communication session between said source of data and said remote terminal.

36. A method for increasing the throughput of data through a device providing an interface between a first network and a second network, comprising the steps of:

receiving a plurality of data packets at said interface and placing said packets in a queue, said packets generated by a source of data connected to said first network and directed to a remote terminal connected to said second network, each of said packets having a packet sequence number;

processing said queue to drop retransmitted packets, said step of processing comprising the steps of:
    (a) comparing said packet sequence numbers of said packets in said queue; and
    (b) dropping a packet in said queue if said packet has a packet sequence number that is the same as a packet sequence number of another packet in said queue;

placing packets en route from said remote terminal to said source of data in a second queue in said device, said packets en route from said remote terminal to said source of data containing an acknowledge sequence number indicating the receipt of a packet from said source of data;

determining a highest acknowledge sequence number for all of said packets in said second queue;

comparing said packet sequence numbers of said packets in said queue with said highest acknowledge sequence number; and determining whether to drop a packet from said queue, the step of dropping performed if a packet in said queue has a packet sequence number lower than said highest acknowledge sequence number.

37. The method of claim 36, wherein said steps of receiving and processing are performed for all of said packets in said queue.

38. The method of claim 36, wherein the method is performed continuously during the duration of a communication session between said source of data and said remote terminal.

39. The method of claim 36, wherein said method is performed in a network access server providing simultaneous access to a plurality of sources of data on a packet-switched network for a plurality of remote terminals in a plurality of simultaneously occurring communication sessions, and wherein the method is performed substantially continuously for each of said communication sessions.

40. The method of claim 39, wherein the method further comprises the steps of placing all of the packets from said sources of data in a system queue in said network access server, identifying all of the queued packets in said system queue which correspond to the same communication session based on addressing information associated with said packets, and performing said step of processing said packets for each of said communications sessions.

41. The method of claim 38, wherein the method is performed in a network access server providing simultaneous access to a plurality of sources of data on a packet-switched network for a plurality of remote terminals in a plurality of simultaneously occurring communication sessions, and wherein said method is performed substantially continuously for each of said communication sessions.

42. The method as claimed in any one of claims 37–41, wherein said packet comprises a header portion and a data portion, and wherein said step of dropping said packet comprises the step of dropping the data portion of said packet.

43. A machine-readable storage media containing a set of 1instructions for processing packets in transit through a network access server from a source of data on a first network to a remote terminal on a second network, said packets in transit placed in a first queue and each having a packet sequence number, said set of instructions comprising:

a routine for determining a highest acknowledge sequence number for packets in a second queue in said network access server, said packets en route from said remote terminal to said source of data;

a routine for comparing said highest acknowledge sequence number with the packet sequence numbers of said packets in said first queue; and a drop routine for dropping packets in said first queue, said drop routine dropping a packet in said first queue if said packet has a packet sequence number lower than said highest acknowledge sequence number.

44. A machine-readable storage media comprising a set of instructions for a communications device providing an interface between a first network and a second network, the set of instructions, when executed, provide for the communications device to perform the following functions:

(1) receiving a plurality of data packets at said interface and placing said packets in a first queue, said plurality of packets including a first packet, said packets of data generated by a source of data connected to said first network and directed to a remote terminal connected to said second network, each of said packets of data having a packet sequence number;

(2) setting an expected transmission sequence number for said first queue equal to the lowest packet sequence number of all of said packets in said first queue; and (3) processing said first packet to determine whether data in said first packet has already been transmitted to said remote terminal, said step of processing comprising the steps of:

(a) comparing the packet sequence number of said first packet with said expected transmission sequence number; and (b) dropping data from said first packet if said first packet has a packet sequence number equal to said expected transmission sequence number and if another packet is present in said queue with a packet sequence number equal to said expected transmission sequence number;

(4) placing packets en route from said remote terminal to said source of data in a second queue in said device, said packets en route from said remote terminal to said source of data containing an acknowledge sequence number indicating the receipt of a packet from said source of data;

(5) determining a highest acknowledge sequence number for all of said packets in said second queue;

(6) comparing said packet sequence numbers of said packets in said first queue with said highest acknowledge sequence number; and (7) determining whether to drop a packet from said first queue, the step of dropping performed if a packet in said first queue has a packet sequence number lower than said highest acknowledge sequence number.

45. The machine-readable storage media of claim 44, wherein said communications device comprises a network access server.

46. An application specific integrated circuit for installation in a communications device providing an interface between a first network and a second network, said application specific integrated circuit comprising:

circuitry receiving a plurality of data packets at said interface and placing said packets in a first queue, said plurality of packets including a first packet, said packets of data generated by a source of data connected to said first network and directed to a remote terminal connected to said second network, each of said packets of data having a packet sequence number;

circuitry setting an expected transmission sequence number for said first queue equal to the lowest packet sequence number of all of said packets in said first queue;

circuitry processing said first packet to determine whether data in said first packet has already been transmitted to said remote terminal, said step of processing comprising the steps of:

comparing the packet sequence number of said first packet with said expected transmission sequence number; and dropping data from said first packet if said first packet has a packet sequence number equal to said expected transmission sequence number and if another packet is present in said queue with a packet sequence number equal to said expected transmission sequence number;

circuitry placing packets en route from said remote terminal to said source of data in a second queue in said device, said packets en route from said remote terminal to said source of data containing an acknowledge sequence number indicating the receipt of a packet from said source of data;

circuitry determining a highest acknowledge sequence number for all of said packets in said second queue;

circuitry comparing said packet sequence numbers of said packets in said first queue with said highest acknowledge sequence number; and circuitry determining whether to drop a packet from said first queue, the step of dropping performed if a packet in said first queue has a packet sequence number lower than said highest acknowledge sequence number.

47. In a communications device providing an interface between a relatively high speed packet switched network and a relatively low speed communications medium, the improvement comprising:

a first system queue for holding packets en route through network access server from a host source of data on said packet switched network to a remote terminal;

a second system queue for holding packets en route through said network access server from said remote terminal to said network access server; and a packet processing means for processing packets in said first system queue and dropping redundant packets which may be present in said first system queue, wherein said packet processing means comprises:

a routine for determining a highest acknowledge sequence number for packets in a second queue in said network access server, a routine for comparing said highest acknowledge sequence number with the packet sequence numbers of said packets in said first queue; and a drop routine for dropping packets in said first queue, said drop routine dropping a packet in said first queue if said packet has a packet sequence number the same as or lower than said highest acknowledge sequence number.

48. The improvement of claim 47, wherein said packet processing means comprises:

a compare routine for comparing packet sequence number for packets in said first queue; and a drop routine for dropping packets in said first queue if more than one of said packets in said queue have the same packet sequence number.

49. The improvement of claim 57, wherein said packets comprise a header portion and a data portion and wherein said drop routine drops the data portion of said packets but does not drop said header portion.

50. The method claimed as in any one of claims 2, 4, 1, 13, 17, and 25–35 and 37–44, wherein the method is implemented in an application specific integrated circuit installed in a communications device providing an interface between a first network and a second network.

* * * * *